United States Patent [19]

Matsuyama et al.

[11] Patent Number: 4,538,891
[45] Date of Patent: Sep. 3, 1985

[54] DEVICE FOR SETTING PHOTOGRAPHIC INFORMATION FOR CAMERA

[75] Inventors: Shinichi Matsuyama, Tokyo; Masami Shimizu, Kanagawa, both of Japan

[73] Assignee: Canon Kabushiki Kaisha, Tokyo, Japan

[21] Appl. No.: 645,011

[22] Filed: Aug. 28, 1984

[30] Foreign Application Priority Data

Aug. 29, 1983 [JP] Japan .................................. 58-157588
Jan. 10, 1984 [JP] Japan .................................. 59-002430

[51] Int. Cl.³ .............................................. G03B 7/08
[52] U.S. Cl. ................................................. 354/289.1
[58] Field of Search ...................... 354/21, 217, 289.1, 354/289.12

[56] References Cited

U.S. PATENT DOCUMENTS

4,081,813 3/1978 Kawamura et al. ............. 354/289.1
4,483,601 11/1984 Sekida et al. ..................... 354/289.1

Primary Examiner—Russell E. Adams
Attorney, Agent, or Firm—Toren, McGeady, Stanger, Goldberg & Kiel

[57] ABSTRACT

Disclosed is an information setting device on a camera which sets photographic information or the like on a camera by continuously renewing one information setting value of the information to another at every predetermined periods. The length of time required for of setting value renewal from one value to another, during the continuous stepwise setting operation is longer when the setting value is a normally frequently used specific value than for other values, so that setting operation is facilitated for such a frequently used value.

9 Claims, 7 Drawing Figures

| FILM SENSITIVITY (ISO) | D4 MSB | D3 | D2 | D1 | D0 LSB | DISPLAY |
|---|---|---|---|---|---|---|
| 12 | 1 | 0 | 1 | 1 | 1 | 12 |
| 16 | 1 | 1 | 0 | 0 | 0 | 16 |
| 20 | 1 | 1 | 0 | 0 | 1 | 20 |
| 25 | 1 | 1 | 0 | 1 | 0 | 25 |
| 32 | 1 | 1 | 0 | 1 | 1 | 32 |
| 40 | 1 | 1 | 1 | 0 | 0 | 40 |
| 50 | 1 | 1 | 1 | 0 | 1 | 50 |
| 64 | 1 | 1 | 1 | 1 | 0 | 64 |
| 80 | 1 | 1 | 1 | 1 | 1 | 80 |
| 100 | 0 | 0 | 0 | 0 | 0 | 100 |
| 125 | 0 | 0 | 0 | 0 | 1 | 125 |
| 160 | 0 | 0 | 0 | 1 | 0 | 160 |
| 200 | 0 | 0 | 0 | 1 | 1 | 200 |
| 250 | 0 | 0 | 1 | 0 | 0 | 250 |
| 320 | 0 | 0 | 1 | 0 | 1 | 320 |
| 400 | 0 | 0 | 1 | 1 | 0 | 400 |
| 500 | 0 | 0 | 1 | 1 | 1 | 500 |
| 640 | 0 | 1 | 0 | 0 | 0 | 640 |
| 800 | 0 | 1 | 0 | 0 | 1 | 800 |
| 1000 | 0 | 1 | 0 | 1 | 0 | 1000 |
| 1250 | 0 | 1 | 0 | 1 | 1 | 1250 |
| 1600 | 0 | 1 | 1 | 0 | 0 | 1600 |

DEVICE FOR SETTING PHOTOGRAPHIC INFORMATION FOR CAMERA

BACKGROUND OF THE INVENTION

1. Field of the Invention

This invention relates to a device for setting a photographic information value of a camera, such as film sensitivity, shutter time, an aperture value or the like and more particularly to an information setting device which electrically performs information setting and renewal in response to operation of a push-button or the like.

2. Description of the Prior Art

Heretofore, 14 setting photographic information at variable circuit elements of a camera of an exposure control circuit varied the positions of the variable elements by manually operating mechanical information setting mechanisms such as an ASA dial, a shutter dial, an aperture ring and the like, which are interlocked with the variable elements. In photography, therefore, these setting mechanisms, which are disposed on the camera body or on a lens, must be operated separate from one another. This has hindered rapid photography.

To solve this problem, there have been proposed some information setting devices which set renewed information stepwise by a depressing a push-button with a counting circuit, such as a counter which performs counting action in response to depression of the push-button depressing operation. For example, the devices of the push-button type were disclosed in Japanese Laid-Open Patent Applications Nos. SHO 51-143327, SHO 52-33726, SHO 53-58233 and U.S. Pat. Nos. 4,081,813 and 4,191,458.

However, if the stepwise renewal speed is lowered in such a manner as in the prior art push-button type devices, a long period of time is required for information setting, which hinders rapid information setting. Conversely, is the stepwise renwal speed is quickened, the period of information renewal might become shorter than the time required for releasing the push-button from its depressed condition when a desired information setting value is obtained. Under such a condition, therefore, the desired information setting value tends to be shifted to another information setting value before the stepwise setting operation stops.

It is an object of this invention to provide an information setting device of the above type in which, when the information setting value reaches a frequently used value during the stepwise setting operation, the renewal speed or the ensuing shift to the next setting value which is less frequently used is reduced to prevent the frequently used setting value from being erroneously set. Frequently used information setting values are renewed quickly for sufficiently rapid information setting.

It is another object of the invention to provide an information setting device comprising an information setting switch which is manually shiftable from a first to a second condition; a pulse forming circuit which produces pulses at every predetermined period; a counter which detects the condition of the above switch and which sets information in a digital value by counting the number of pulses produced from the pulse forming circuit when the switch is in the second condition; detecting means which produces a detection signal when the count value of the counter reaches a value corresponding to a frequently used information setting value; and a correcting means which, in response to the detection signal of the detecting means, lengthens the pulse forming period of the pulse forming circuit more than the above predetermined period. The information setting device thus prevents erroneous setting of information setting values frequently used by the setting operator by solely reducing the renewal speed for such values while retaining the promptness of the information setting operation.

It is a further object of the invention to provide an information setting device which shifts a setting value stepwise every time a push-button is depressed and also automatically and continuously shifts the setting value step by step when the push-button is continually depressed. The device is characterized by an arrangement to prevent erroneous setting of a normal frequently employed value by extending the period for shifting the normal frequently employed value to a next setting value to a period greater than the period for shifting other values when the setting value reaches the frequently employed value during the stepwise continuous setting operation. In this manner erroneous setting of a normal frequently employed setting value can be prevented.

These and further objects and features of the invention will become apparent from the following detailed description of preferred embodiments thereof taken in conjunction with the accompanying drawings.

SUMMARY OF THE INVENTION

A device for setting photographic information, etc., including an operation member for information setting operations, an information forming circuit which periodically renews the setting value of the information from one value to another in response to the operation of the operation member, and a control circuit which extends the period of the periodical renewal when the value of information set by the information forming circuit becomes a specific value providing a longer renewal period of the specific value to another other than the period provided for renewal of other values.

DETAILED DESCRIPTION OF THE PREFERRED EMBODIMENTS

Figure 1:
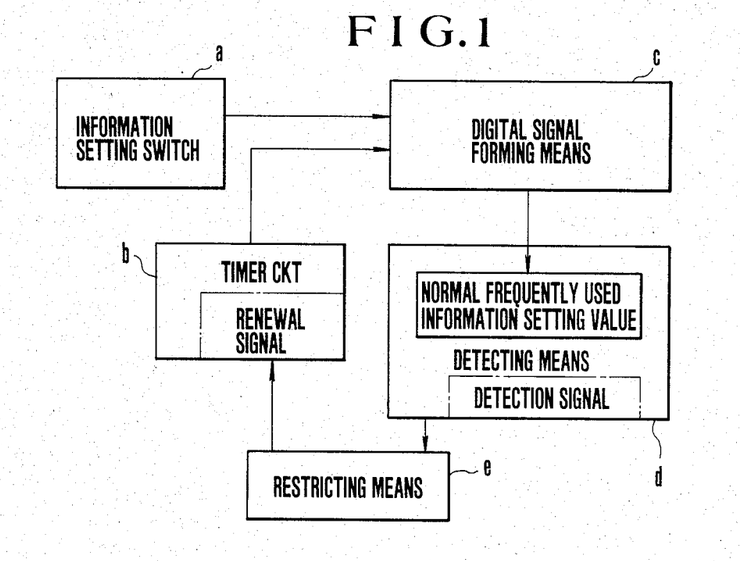
FIG. 1 is a block diagram showing the operating principle of an information setting device according to the present invention.
Figure 2:
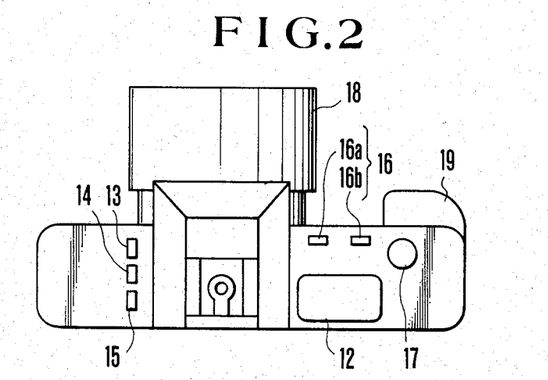
FIG. 2 is a plan view showing the appearance of a camera to which the invented information setting device is applied.

FIG. 1 shows, in a block diagram, the operating principle of the information setting device according to the present invention. Referring to FIG. 1, the operating principle of the invention is as follows: A digital signal forming means "c" forms a digital value and renews it in a stepwise manner in response to a renewal signal from a timer circuit "b", which produces the renewal signal at every predetermined period when an information setting switch "a" is operating. The digital information value is thus renewed stepwise at every period defined by the timer circuits "b". A detecting means "d" detects the digital value formed by the digital signal forming means "c" and produces a detection signal when the digital value becomes a normal frequently employed information setting value. A restricting means "e" changes the above predetermined period at which the renewal signal is produced from the timer circuit "b" to a longer period in response to the detection signal. In accordance with the invention, therefore, when the setting value becomes a normal frequently used setting value, the renewal period before renewal to a next value is prolonged, so that the value frequently set by the setting operator is not erroneously set without imparting the promptness of the information setting operation. The invented arrangement enhances the operability of the above type of information setting device. The more specific arrangement of the information setting device will be understood from the following description:

FIG. 2 shows, by way of example, the appearance of a camera to which the information setting device according to the invention is applied. Referring to FIG. 2, the camera is provided with a display device 12 which displays the information setting value. The display device 12 is composed of, for example, a digital display arrangement of seven segments or the like or a so-called dot display arrangement, which selectively actuates predetermined dots based on the setting value displayed. Furthermore, the display device 12 may be in the form of a liquid crystal device or an LED display device. An exposure control mode selection button 13 permits selection of an automatic exposure control mode or a manual mode. A film sensitivity selection button 14 permits selection of a film sensitivity setting mode. Reference numeral 15 identifies a battery check button. An information setting operation member 16, which is a push-button, permits stepwise renewal of an information setting value. The information setting operation member or push-button 16 consists of a step-up botton 16b which causes the information setting value to be increased in a stepwise manner and a step-down button 16a which causes the information setting value, to also be decreased in a stepwise manner. The camera further includes a shutter release button 17; a photo-taking lens; and a grip part 19. While FIG. 2 shows only the external display device, it goes without saying that the display device can also be within a camera view finder.

Figure 3:
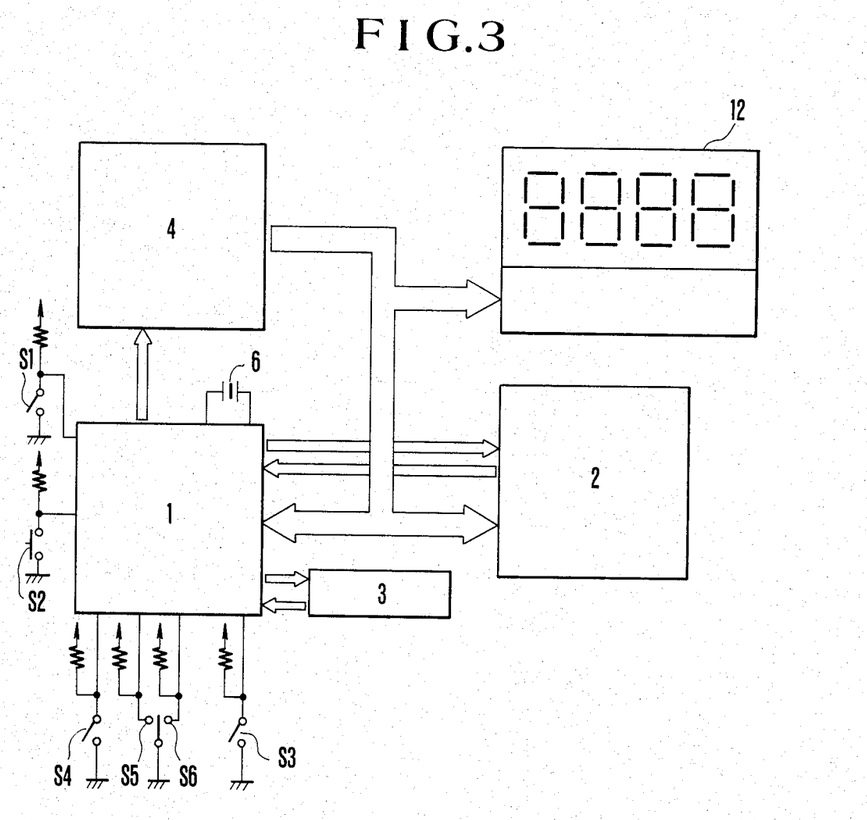
FIG. 3 is a circuit diagram showing an information setting device arranged in an embodiment of the invention. as FIG. 4 is a table showing the display operation of a display device shown in FIG. 3.

FIG. 3 shows in a block diagram the electric circuits of a camera arranged according to the invention. A block 1 represents a sequence controller which consists of a CPU, etc. and which controls the operations of the camera. The sequence controller 1 includes a film sensitivity setting-in-process flag register (not shown) which is disposed within the controller 1; a buzzer 6 which is outside the controller 1 to give a warning; a light measurement switch S1 which closes in response to the first stroke on the shutter release button 17; a release switch S2 which closes in response to the second stroke on the shutter release button 17; a battery check switch S3 interlocked with the battery check button 15; a film sensitivity setting switch S4 which is responsive to the film sensitivity selection button 14; an up switch S5 which is responsive to the step-up button 16b; and a down swtich S6 which is responsive to the step-down button 16a. To the sequence controller 1 are connected a photometric computing exposure control circuit 2; a programmable timer 3; and a film sensitivity storage circuit 4. The sequence controller 1 produces a control signal based upon receipt of information from each of these circuits 2, 3, 4.

The photometric computing exposure control circuit 2 measures light in response to light measuring instruction from the sequence controller 1 and performs exposure computation. The exposure control circuit 2 then supplies the sequence controller 1 with information as to whether or not the measured light quantity is such that no apposite exposure can be made through exposure control. When the sequence controller 1 advises a shutter release, the exposure control circuit 2 performs light measurement and exposure computation. Then, shutter release is carried out with an exposure supplied at an aperture value and a shutter opening time value is thus obtained through the computation.

Figure 4:
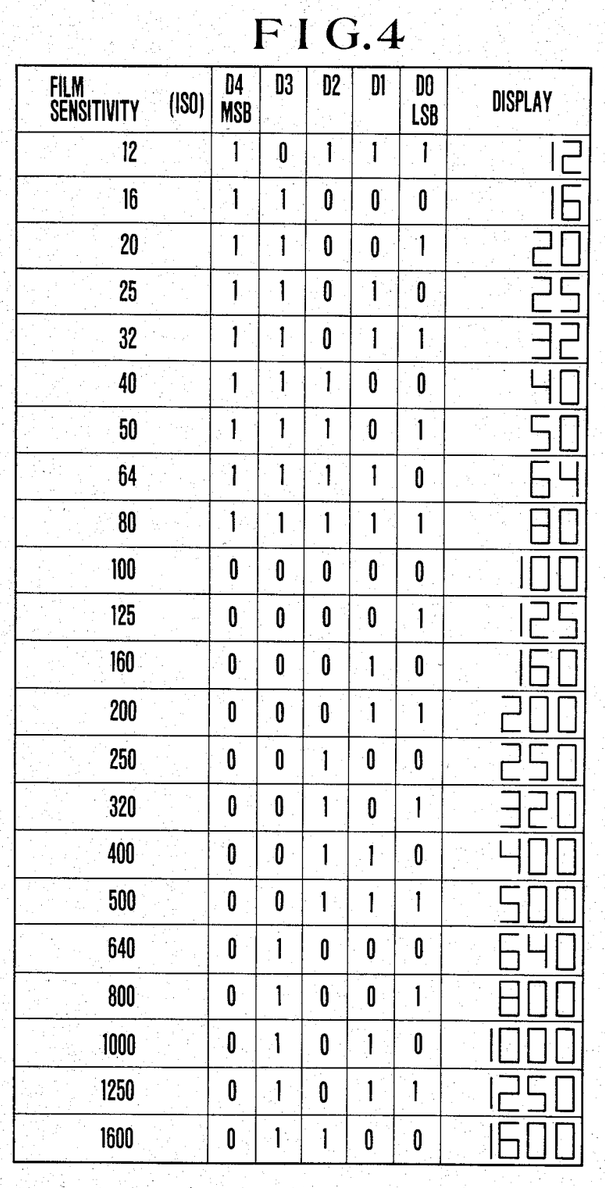

The film sensitivity storage circuit 4 stores an electrical signal representing a set film sensitivity value in the form of data shown in FIG. 4. The film sensitivity et value is changeable by instruction from the sequence controller 1. Furthermore, when power is switched on, the film sensitivity setting value is automatically set as ISO/ASA=100 (all data are at 370"). The film sensitivity setting value stored at the film sensitivity storage circuit 4 is supplied to the sequence controller 1, the photometric, computing, exposure control circuit 2 and the film sensitivity display device 12. In the event of a change in the film sensitivity setting value, the sequence controller 1 controls the manner in which instruction for changing the film sensitivity setting value is given. In performing an exposure computation, the photometric computing exposure control circuit 2 obtains an exposure value by performing a computing operation on a light measurement value obtained by itself and on the above film sensitivity setting value.

The film sensitivity display device 12 comprises a decoder which converts the datum of the film sensitivity setting value obtained from the film sensitivity storage circuit 4 into a 7-segment flickering signal of four figures; a liquid crystal driving circuit which causes a 7-segment display of four figures to be lit up based on the flickering signal fo the decoder; and a liquid crystal display device which is driven by the liquid crystal driving circuit to make a 7-segment display in four figures representing an ISO/ASA film sensitivity value. The film sensitivity display device 12 thus display one of the displays shown in FIG. 4 based on the datum of the film sensitivity setting value.

The programmable timer 3 has a count terminating value arbitrarily set by the sequence controller 1 and begins to count in response to an instruction given by the sequence controller 1 for count commencement. The programmable timer 3 stops counting when the count value reaches the count terminating value and supplies signals to the sequence controller 1 during the counting process.

Figure 5:
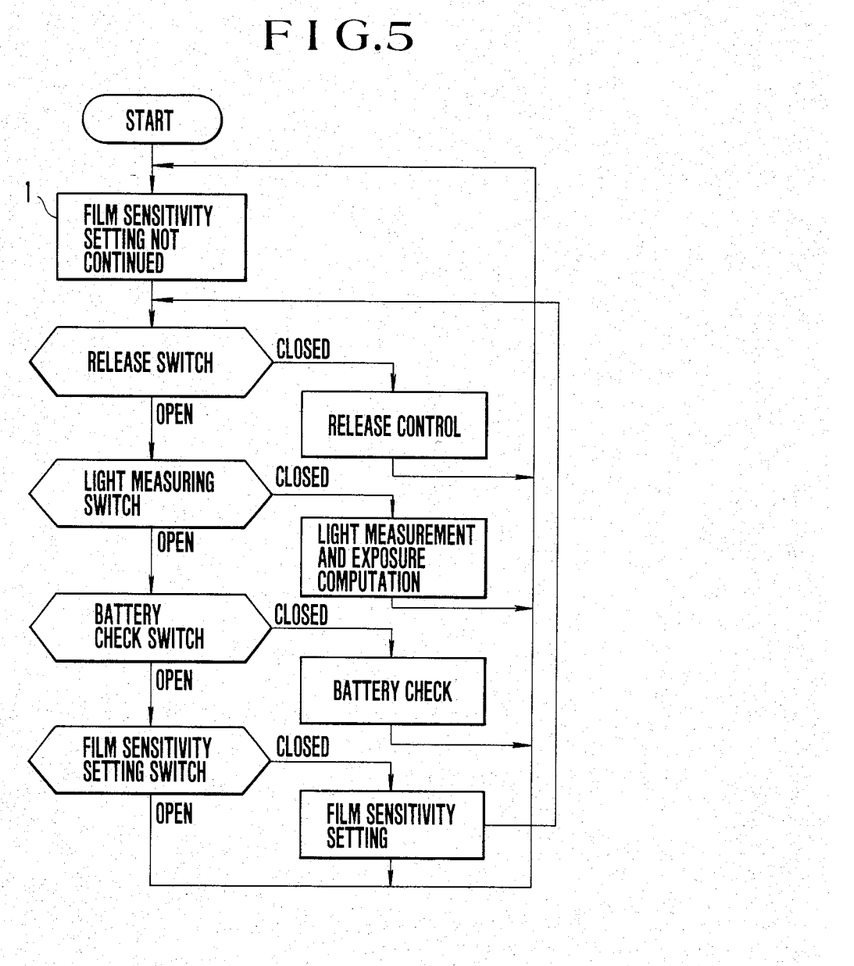
FIG. 5 is a program flow chart showing the operation of the information setting device of FIG. 3.

FIG. 5 is a flow chart showing the operation of the sequence controller 1 shown in FIG. 3. The operation of the camera sequence controller 1 will be described with reference to the flow chart of FIG. 5: When the power supply of the camera is switched on, the sequence controller 1 operates from a status 1 "start". First, it is assumed that the film sensitivity setting operation is not continuing (see reference numeral 1 of FIG. 5). Next, it is determined whether the release switch (S2 of FIG. 3) is open or closed. If the release switch S2 is closed, the camera shifts to a status 2 "release control" in which the photometric, computing, exposure control circuit 2 of FIG. 3 performs light measurement and exposure computation. Then, an exposure is supplied at an aperture value and a shutter opening time value is obtained from exposure computation. In this instance, the photometric, computing, exposure control circuit 2 of FIG. 3 obtains an exposure value on the basis of the film sensitivity information obtained from the film sensitivity storage circuit 4 of FIG. 3 and a light measurement value which is obtained by itself. Upon completion of the status 2 "release control", the operation returns to step 1 shown in FIG. 5.

If the release switch S2 is open, the operation does not go to the status 2 "release control" but determines whether the light measurement switch S1 (see FIG. 3) is open or closed. If the light measurement switch S1 is open, the operation proceeds to the next step in which it is determined whether the battery check switch S3 (see FIG. 3) is open or closed. If the light measurement switch S1 is closed, the operation proceeds to a status 3 "light measurement and exposure computation". Upon completion of the process of the status 3 light measurement and computation, the operation goes back to step 1 of FIG. 5. In the status 3 "light measurement and exposure computation," the circuit 2 of FIG. 3 performs light measurement and obtains an exposure value by performing computation on the film sensitivity information obtained from the circuit 4 of FIG. 3 and a light measurement value obtained by itself. If the exposure value thus obtained barely permits adequate exposure by controlling the shutter time and the aperture value, a warning is sounded by means of the buzzer 6 of FIG. 3.

While determining whether the battery check switch S3 is open or closed, if the battery check switch S3 of FIG. 3 is open, the operation goes to the next step of determining whether the film sensitivity setting switch S4 is open or closed. If battery-switch switch S3 is determined to be closed, the operation proceeds to a status 4 "battery check". In the status 4 "battery check," the power supply voltage is detected. The buzzer 6 of FIG. 3 is sounded urging the photographer to replace the battery if the power supply voltage is below a predetermined level. Upon completion of the status 4 "battery check," the operation goes back to step 1 of FIG. 5 repeating again the above processes from step 1.

When determining whether the film sensitivity setting switch S4 (FIG. 3) is open or closed, if the film sensitivity switch S4 is open, the operation goes back to step 1. If the film sensitivity switch S4 is closed, the operation proceeds to a status 5 "film sensitivity setting". Upon setting completion, the operation shifts to the step of determining whether the release switch S2 is open or closed. In the status 5 "film sensitivity setting", the datum of the film sensitivity setting value stored at the film sensitivity storage circuit 4 (FIG. 3) is altered by closing either an up switch S5 or a down switch S6 (FIG. 3). This setting value altering process will be further described below with reference to FIG. 6.

Figure 6:
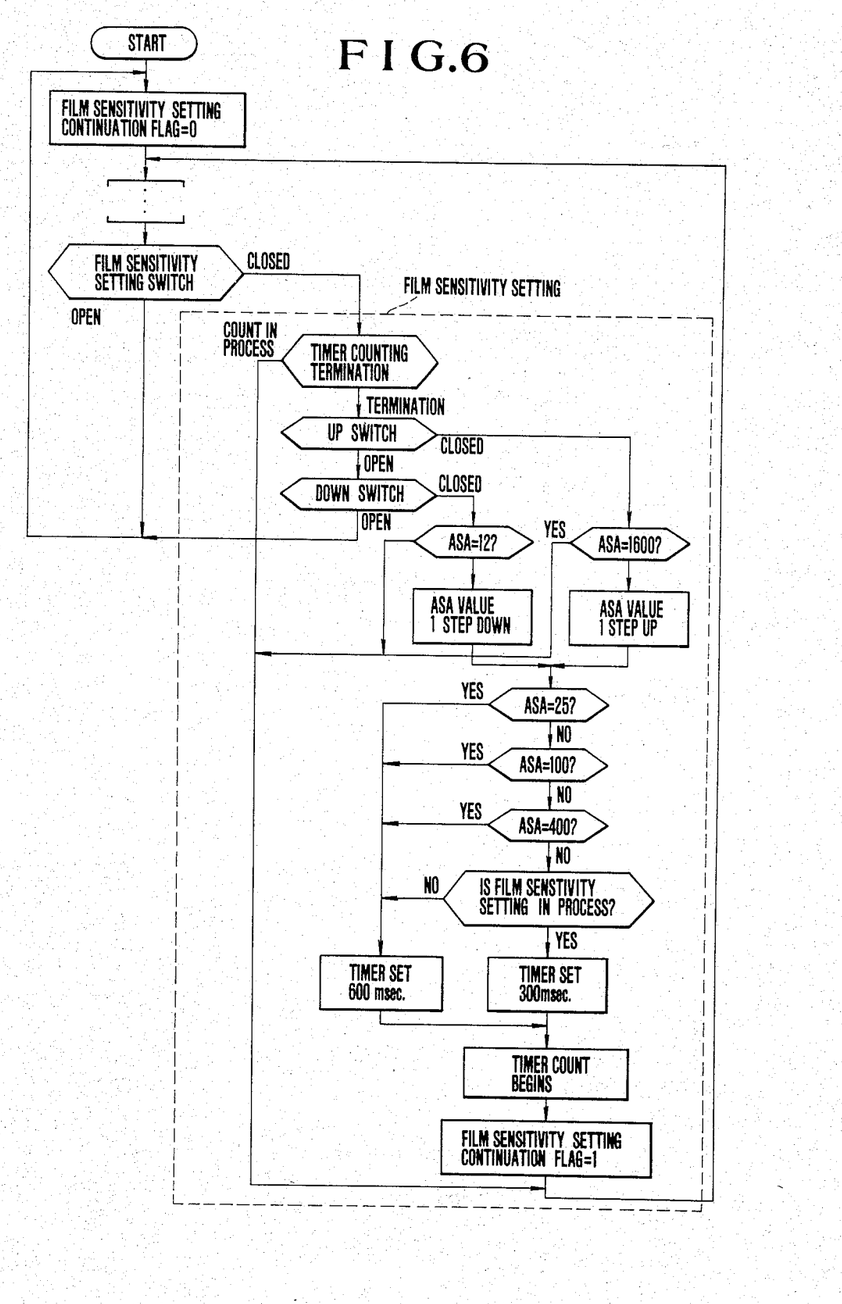
FIG. 6 is a flow chart showing the flow of FIG. 5 in further detail.

FIG. 6 is a flow chart showing the details of the status 5 "film sensitivity setting" of the sequence controller 1 shown in FIG. 3. As described above, after the power supply of the camera is switched on, the operation of the sequence controller 1 operates from the "start". To obtain a condition of "film sensitivity setting not continued", the film sensitivity setting continuation flag is reset to "0". After that, the steps of determining whether the release switch S2, the light measurement swtich S1, the battery check switch S3 and the film sensitivity setting switch S4 are open or closed are carried timer 3 one after another, and repeated if all the switches S1, S2, S3, S4 are found open, as described in the foregoing with reference to FIG. 5. In this instance, if the film sensitivity rest. switch S4 is alone found closed while all other switches including the release switch S2, the light measurement switch S1 and the battery check switch S3 are found open, the operation departs from the step of determining whether the film sensitivity setting switch S4 is open or closed and proceeds to the status 5 "film sensitivity setting". In this situation, in a first step, it is determined whether the counting operation of the programmable timer has been completed. It is determined whether the programmable timer 3 (FIG. 3) is still in the process of counting or has completed counting and is at repose. If the programmable timer 3 is counting, the operation departs from the status 5 "film sensitivity setting" and shifts to the step of determining whether the release switch S2 is open or closed, as shown in FIG. 5. If the counting process is completed, the operation proceeds the step of determining whether the up switch S5 is open or closed.

This programmable timer 3 has a predetermined value set upon completion of the status 5 "film sensitivity setting" and then counts. Therefore, the programmable timer 3 is not counting when the operation shifts to the status 5 "film sensitivity setting" for the first time. In that instance, therefore, the operation immediately proceeds to the step of determining whether the up switch S5 (FIG. 3) is open or closed.

If the up switch S5 is closed, the operation proceeds to the step of determining whether or not the setting value of film sensitivity is an ISO/ASA value of 1600 (maximum sensitivity setting value). If not, the operation shifts to the next step of performing a "film sensitivity 1 step up" action. Then, by this action, the film sensitivity information value stored at the storage circuit 4 is renewed, or increased by one step. In this specific embodiment, each renewal step for the film sensitivity setting value is $\frac{1}{3}$ of the step of the APEX system values. Accordingly, the film sensitivity setting value is increased by $\frac{1}{3}$ step by the above renewal process of increasing by one step.

Ater this step of renewing the film sensitivity setting value by one step, the operation proceeds to the step of determining whether or not the renewed value is an ISO/ASA film sensitivity value of 25. If the renewed setting value is not ISO/ASA=25, the operation proceeds to the step of determining whether or not it is ISO/ASA=100. If it is not, the operation proceeds to the next step of determining whether or not it is ISO/ASA=400. If not, the operation proceeds further to a step of determining whether film sensitivity setting is in process. This is determining by whether the film sensitivity setting continuation flag is "1" of "0". If the film sensitivity setting value does not correspond to any of the values ISO/ASA=25, 100 and 400, the film sensitivity setting continuation flag cannot be detected. Since this flag is set at "0" when the power is switched on as mentioned in the foregoing, detection of this flag causes a count terminating value of 600 msec to be set at the programmable timer 3. After setting this counting value of 600 msec at the programmable timer 3, the operation proceeds to the step of "commencement of count by timer". Then, the programmable timer 3 begins to count. Then, the operation proceeds to the step of "flag setting", at which the film sensitivity setting continuation flag is set at "1". Then, the operation flow again shifts to the step of determining whether the release switch S2 is open or closed.

Under that condition, if the film sensitivity setting switch S4 alone is closed among the switches S1-S4, the operation again shifts to the above status 5 "film sensitivity setting".

During determination of the count termination the programmable timer 3 in the initial round of the status 5 "film sensitivity setting", the operation immediately shifts to the step of determining whether the up switch S5 is open or closed. However, in the second and subsequent rounds of the status 5 "film sensitivity setting", the programmable timer 3 has already begun to count, as mentioned in the foregoing. In this instance, therefore, the operation does not shift to the step of determining whether the up switch S5 is open or closed until counting completion of the set counting value of 600 msec. After the lapse of 600 msec, the programmable timer 3 produces a renewal signal. Then, the up switch S5 is checked for its open or closed condition. If the up switch S5 is still closed after the lapse of 600 msec, the above action of "ASA value 1 step up" is again performed increasing the film sensitivity setting value by one step.

Following this, the steps of detecting whether the film sensitivity setting value is ASA 25, 100 or 400 and the step of detecting the flag are again carried out with the "timer set" action also carried out. However, since the flag has been set at "1" through the processes of the initial "film sensitivity setting" status 5 as mentioned in the foregoing, the above action of "timer set 600 msec" is replaced with another action of "timer set 300 msec" and the programmable timer 3 is set at a counting value of 300 msec in the second or subsequent status of "film sensitivity setting". After that, in the same manner as in the initial status 5 of "film sensitivity setting", the programmable timer 3 begins to count and the flag is set at "1" to complete the processes of the status 5 "film sensitivity setting". Then, after the lapse of 300 msec, if both the switches S4 and S5 are still closed, the "1 step up" action is again performed on the film sensitivity setting value.

Thus, if the switches S4 and S5 are closed, the second film sensitivity one step up action is performed after the lapse of a time interval of 600 msec from the end of the initial film sensitivity one step up action. after that, the film sensitivity one step up action is repeatedly performed at intervals of 300 msec to increase the film sensitivity setting value.

As mentioned above, after the second round of the "film sensitivity setting" status 5, the film sensitivity setting value is increased by one step at intervals of 300 msec. However, if the film sensitivity value is set at any of the normally employed setting values ISO/ASA=25, 100 and 400, a detection signal is produced in the above "film sensitivity setting" status 5 at the step of determining whether the film sensitivity setting value is ASA=25, 100 or 400. Then, with the detection signal thus produced, the action of "timer set 600 msec" is selected during the next step, instead of the "timer set 300 msec". Accordingly, with the normally employed setting value, the renewal action from the normally employed setting value to a next setting value is 600 msec instead of 300 msec.

With the film sensitivity setting value thus renewed step by step in the manner described above, when the setting value reaches a desired value, the switch S4 or S5 is opened to inhibit shifting to the status 5 "film sensitivity setting" thereafter, so that the camera can be set at a desired film sensitivity value.

In accordance with the invention, as will be understood from the foregoing description, a normal frequently used film sensitivity value can be selected without fail despite a relatively high renewal speed of information on the film sensitivity setting value, because: When the film sensitivity setting value reaches each of the normally used setting values during the stepwise renewal operation, the length of time required for renewal from the normally used value to a less frequently used value longer providing the operator with sufficient time for confirming the setting value at a display device before opening the switch S4 and S5. Furthermore, in the stepwise renewal operation, when the film sensitivity setting value reaches ISO/ASA=1600 (the maximum sensitivity value), the stepwise renewal operation is prohibited thereafter.

The operation described above is performed with the up switch S5 closed. However, where the down switch S6 is closed instead of the up switch S5, the stepwise setting value renewing operation can also be carried out in the same manner except that the setting value decreases step by step. More specifically, when the up switch S5 is open and the down switch S6 is closed, the setting value is determined by whether it is ISO/ASA=12 (a minimum sensitivity value). If it is not, the ASA value is decreased by one step ($\frac{1}{3}$ step). After that, the setting value renewing operation is carried out in the same manner as the "one step up" actions mentioned in the foregoing. In other words, the stepwise renewal time interval is set at 600 msec for the one step renewal between the first and second steps and renewal of a normally used setting value such as ISO/ASA=25, 100 or 400 to a less frequently used setting value. The stepwise renewal processes for all other setting values are respectively carried out at intervals of 300 msec. Furthermore, in the "one step down" operation, when the film sensitivity setting value reaches an ISO/ASA value of 12 (a minimum film sensitivity value), the subsequent or further film sensitivity setting value renewing operation is prohibited as in the case of the maximum film sensitivity value.

In the information setting device according to this invention, the setting information is renewed stepwise at relatively short intervals and, when the setting information reaches a normally frequently used setting value, the stepwise renewal time interval before a next setting value is lengthened. Therefore, when the camera is set at a normally frequently used setting value, the information can be consistently set at the desired value, while the information setting operation as a whole is promptly accomplished.

Figure 7:
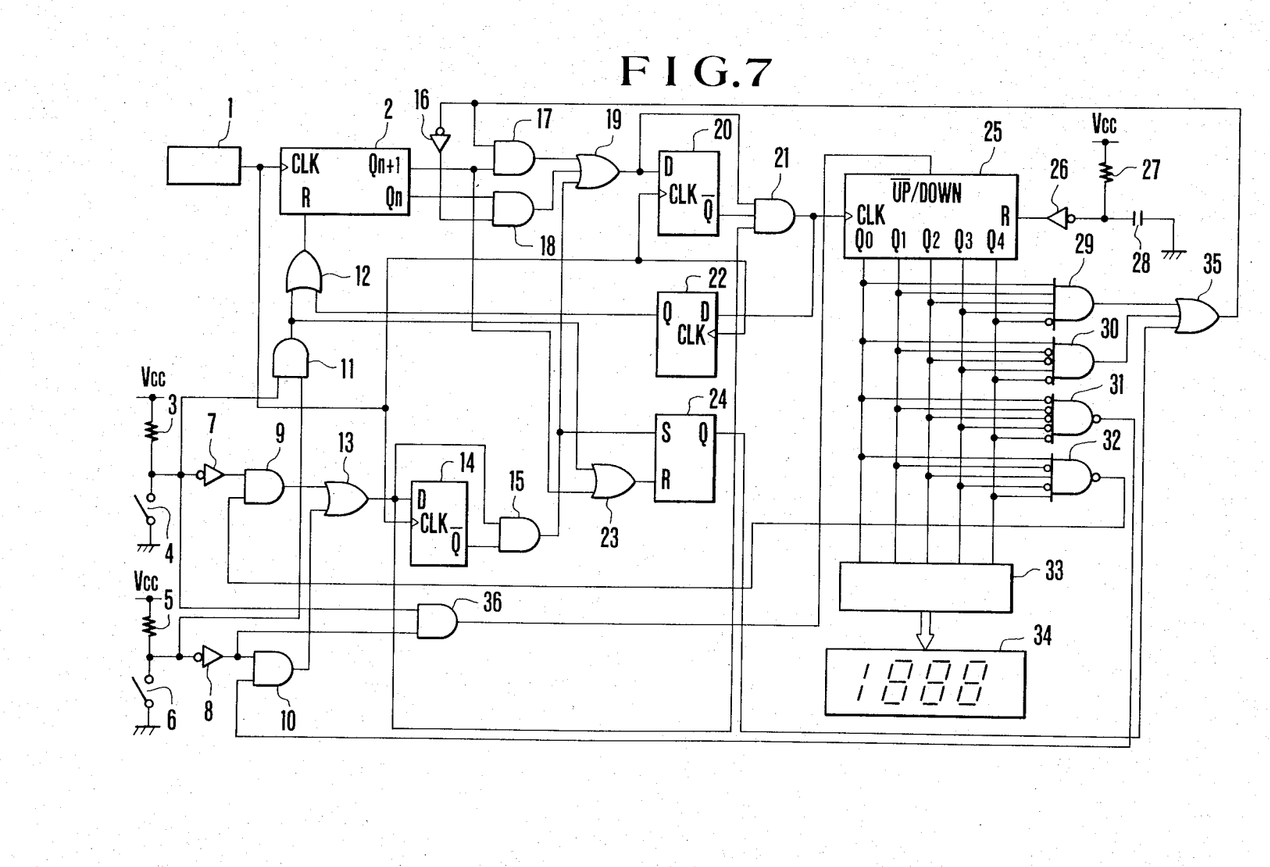
FIG. 7 is a circuit diagram showing the invented information setting device as applied to the film sensitivity information setting device of a camera in another embodiment of the invention.

FIG. 7 is a circuit diagram showing an information setting device according to the invention in another embodiment. The embodiment shown in FIG. 7 includes a pulse oscillator 1 which generates reference clock pulses; and a counter 2. The pulses from the pulse oscillator 1 are impressed on the CLK terminal of the counter 2. When a predetermined number of pulses are counted, a Qn terminal and a Qn+1 terminal of the counter 2 produce high level signals, one after another. The counter 2 is provided with a reset terminal R. With a high level signal (hereinafter a high level will be called H) impressed on the R terminal, the counter 2 is reset and the Qn and Qn+1 output terminals produce output signals at a low level (hereinafter a low level will be called L). Pull-up resistors 3 and 5 are provided for switches 4 and 6, with one terminal of each of the pull-up resistors 3 and 5 connected to a power supply line. The switches 4 and 6 are provided for up counting and down counting for a display, as will be described later in detail. The embodiment further includes inverters 7 and 8; AND gates 9, 10 and 11; OR gates 12 and 13; a D-input flip-flop 14 (hereinafter called DFF); an AND gate 15 which forms a one-shot multivibrator in conjunction with with D-input flip-flop DFF 14; an inverter 16; AND gates 17 and 18; an OR gate 19; flip-flops DFF's 20 and 22; an AND gate 21 which forms a one-shot multivibrator jointly with the DFF 20; an OR gate 23; an RS-input flip-flop 24; and an up-down counter 25. The up-down counter 25 performs a down count action with an H input impressed on its $\overline{UP}$/DOWN terminal and an up count action with an L input impressed on the terminal. The counter 25 produces count outputs from terminals Q0–Q4. When an H signal is impressed on the R terminal of the counter 25, the count action ends and the levels of all the outputs Q0–Q4 becomes low. This counter 25 is provided for setting film sensitivity information. The relation between the count values of the counter 25 and film sensitivity setting values is shown in the table below:

| ASA | Q0 | Q1 | Q2 | Q3 | Q4 |
|---|---|---|---|---|---|
| 12 | 0 | 0 | 0 | 0 | 0 |
| 16 | 1 | 0 | 0 | 0 | 0 |
| 20 | 0 | 1 | 0 | 0 | 0 |
| 25 | 1 | 1 | 0 | 0 | 0 |
| 32 | 0 | 0 | 1 | 0 | 0 |
| 40 | 1 | 0 | 1 | 0 | 0 |
| 50 | 0 | 1 | 1 | 0 | 0 |
| 64 | 1 | 1 | 1 | 0 | 0 |
| 80 | 0 | 0 | 0 | 1 | 0 |
| 100 | 1 | 0 | 0 | 1 | 0 |
| 125 | 0 | 1 | 0 | 1 | 0 |
| 160 | 1 | 1 | 0 | 1 | 0 |
| 200 | 0 | 0 | 1 | 1 | 0 |
| 250 | 1 | 0 | 1 | 1 | 0 |
| 320 | 0 | 1 | 1 | 1 | 0 |
| 400 | 1 | 1 | 1 | 1 | 0 |
| 500 | 0 | 0 | 0 | 0 | 1 |
| 640 | 1 | 0 | 0 | 0 | 1 |
| 800 | 0 | 1 | 0 | 0 | 1 |
| 1000 | 1 | 1 | 0 | 0 | 1 |
| 1250 | 0 | 0 | 1 | 0 | 1 |
| 1600 | 1 | 0 | 1 | 0 | 1 |

The output terminals of the counter 25 are connected to a computing circuit (not shown). The computing circuit performs computing operations on the film sensitivity information, a brightness value and a preset aperture value or a shutter time value. Further provided in the embodiment are an inverter 26; a resistor 27 which has one terminal connected to the power supply line; and a capacitor 28 which forms a power-on-reset circuit jointly with the above inverter 26 and the resistor 27. The power-on-reset circuit resets the counter 25 when a predetermined voltage is supplied from the power supply line with the inverter 26 producing an H level output for a predetermined period of time determined by the resistor 27 and the capacitor 28. Also included in the embodiment are 5-input AND gates 29 and 30; and 5-input NAND gates 31 and 32. In the drawing, marks "o" identify inverters. There is provided a decoder driver 33 which converts the outputs Q0–Q4 of the counter 25 into codes suited for display and which drives a 7-segment display device 34. The display device 34 is composed of, for example, a liquid crystal, LED's or the like.

The embodiment which is shown in FIG. 7 and is arranged as described above operates in the following manner: When the power supply switch (not shown) is turned on, a power source voltage Vcc is supplied to each of the applicable parts. If both the switches 4 and 6 are off, the two inputs of the AND gate 11 are both at high levels and therefore the output level of the AND gate 11 is high. Accordingly, the OR gate 12 produces an H output which is impressed on the R terminal of the counter 2. The counting operation of the counter 2 stops. With the power switched on, the power-on-reset circuit, which is composed of the inverter 26, the resistor 27 and the capacitor 28 operates. The H output thus produced from the power-on-reset circuit initially resets the counter 25. All the output terminals Q0–Q4 of the counter 25 then produce L outputs. The decoder driver 33 converts these L outputs into codes, causing the display device 34 to display "12".

To set the camera at a film sensitivity value, when an up button is depressed once, the switch 4 momentarily turns on. The inverter 7 then momentarily produces an H output which is impressed on one of the input terminals of the gate 9. Meanwhile, the other input terminal of the gate 9 is connected to the output terminal of the NAND gate 32. However, since all the outputs from the output terminals Q0–Q4 are at L levels, the output of the NAND gate 32 is at an H level. As a result, the output level of the AND gate 9 becomes and remains high for a length of time during which the switch 4 is on. A signal thus obtained is impressed via the OR gate 13 on the D terminal of the flip-flop DFF 14. Therefore, the one-shot multivibrator, consisting of the flip-flop DFF 14 and the AND gate 15, causes the output terminal of the AND gate 15 to produce a predetermined one-shot pulse therefrom. The one-shot pulse is impressed via the OR gate 19 on the D terminal of the flip-flop DFF 20. Another one-shot multivibrator, which is composed of the flip-flop DFF 20 and the AND gate 21, is triggered by the pulse. The output terminal of the AND gate 21 then produces a one-shot pulse.

This one-shot pulse is impressed on the CLK terminal of the counter 25. Then, since the switch 4 is on and the switch 6 is off at that time, the output level of the AND gate 36 is low impressing a low level input on the $\overline{UP}$/DOWN terminal of the counter 25. Therefore, the counter 25 is in an up-counting mode. Therefore, the above one-shot pulse causes the counter 25 to count upward by one. Up counting by one by the counter 25 results in an H output from the output terminal Q0 and L outputs from the other output terminals Q1-Q4. This changes the display of the display device 34 from "12" to "16" and, thus, the camera is set at a film sensitivity value of ASA 16. After that, every time the switch 4 (or the up button) is depressed, the counter 25 up counts by one and the display device 34 displays a film sensitivity value corresponding to the up count value.

During the above process of repeatedly depressing the switch 4 (or the up button), when the film sensitivity setting value reaches "1600", the output terminals Q0, Q2 and Q4 of the counter 25 produce H outputs while other output terminals Q1 and Q3 produce L outputs. Then, in this instance, the NAND gate 32 produces an L output, inhibiting operation of the gate 9. Accordingly, the film sensitivity value is set at a higher limit value of "1600". After that, no pulse is supplied to the counter 25 even if the switch 4 is further operated and the film sensitivity setting value remains at that limit value.

If the switch 6 is operated instead of the switch 4, pulses are produced from the one-shot multivibrators 14, 15, 20 and 21 every time the switch 6 is operated. The counter 25 then renews its content step by step in the same manner as with the operation of the switch 4. However, since the AND gate 36 produces an H output when the switch 6 turns on, the counter 25 comes assumes a down count mode. Therefore, in this situation, the above one-step counting operation is performed downward.

With the switch 6 operating in place of the switch 4, the film sensitivity value displayed at the display device 34 gradually shifts stepwise in the direction of lower sensitivity from a high sensitivity value every time the switch 6 is operated. Furthermore, during this operation, when the display value reaches the lower limit sensitivity setting value of "12", all the output terminals Q0–Q4 of the counter 25 produce L outputs. Therefore, the NAND gate 31 produces an L output inhibiting operation of the gate 10. After the film sensitivity is set at the lowest sensitivity value, the one-shot multivibrators 14, 15, 20 and 21 no longer respond to operation of the switch 6. The count value of the counter 25 then remains at the lowest sensitivity value.

As described above, a digital value corresponding to a desired film sensitivity value can be set at the counter 25 with the switch 4 or 6 repeatedly operated until the display value reaches the desired value, while confirming the film sensitivity setting value as it is displayed at the display device 34.

In the event that the switch 4 (or the up button) is continually depressed, the embodiment operates as follows: Let us assume that all the outputs Q0–Q4 of the counter 25 are at low levels with the power supply switched on and that the film sensitivity value of "12" is on display at the display device 34. When the switch 4 is turned on under this condition, the AND gate 36 produces an L output bringing the counter 25 into an up-count mode. Meanwhile, with the switch 4 turned on, the one-shot multivibrators (14 and 15; 20 and 21) produce a one-shot pulse, causing the counter 25 to up count by one step. As a result, the display device 34 displays a film sensitivity value of "16". Meanwhile, with the switch 4 remaining continually closed, the AND gate 11 continually produces an L output. The Q output terminals of the flip-flop DFF 22 also continuously produce an L output. This causes the OR gate 12 to continuously produce an L output keeping the counter 2 continually preventing a reset condition. Thus, the counter 2 begins to count the clock pulses produced from the clock pulse generator or oscillator 1. The counter 2 from its output terminals Qn and Qn+1 high level (H) outputs, after the lapse of predetermined periods of time from the beginning of the count (250 msec and 500 msec, for example). The flip-flop DFF 24 is set by a pulse produced from the multivibrators (14 and 15) when the switch 4 is turned on and produces an H signal from the Q output terminal. This H signal is supplied to one of the input terminals of the AND gate 17 via the OR gate 35. Therefore, when the H output is produced from the output terminal Qn+1 of the counter 2, the AND gate 17 produces an H output, supplied via the gate 19, to the D input terminal of the flip-flop DFF 20. The one-shot multivibrator which is composed of the flip-flop DFF 20 and the gate 21 produces a one-shot pulse in response to this H output received from the output terminal Qn+1 of the counter 2. This pulse causes the counter 25 to up count by one step and thus to shift the display value from "16" to "20". With the switch 4 remaining closed in this manner, the display is first increased by one step immediately after the switch 4 is turned on or closed. After the lapse of 500 msec, the display value is again increased by one step. Furthermore, since the one pulse from the one-shot multivibrator (the flip-flop DFF 20 and the gate 21) is supplied to the flip-flop DFF 22, this pulse also causes the flip-flop DFF 22 to form one pulse. The pulse thus produced from the flip-flop DFF 22 is supplied via the OR gate 12 to the reset terminal R of the counter 2. Therefore, the counter 2 is again reset after the lapse of 500 msec from the start of its count. The counter 2 thus again begins to count the clock pulses from the beginning, after the "one step up count" of the counter 25. Furthermore, since the terminal Qn+1 of the counter 2 is connected to the reset terminal of the flip-flop DFF 24 via the OR gate 23, the flip-flop DFF 24 is reset in response to the H output of the terminal Qn+1 of the counter 2. Therefore, when the counting operation is resumed by the counter 25, an H input is impressed on the AND gate 18 in place of the H input to the AND gate 18. The counter 2 thus resumes its counting operation after the "one step up count" is performed by the counter 25. Then, 250 msec after the resumption of counting, an H output is produced from the output terminal Qn of the counter 2. In response to this H output, the AND gate 18 produces an H output and supplies it via the OR gate 19 to the one-shot multivibrator (the flip-flop DFF 20 and the gate 21). Accordingly, as mentioned in the foregoing, the one-shot multivibrator (the DFF 20 and the gate 21) produces one pulse, causing the counter 25 to up count by one step and to shift the display value to "25".

With the flip-flop DFF 22 thus actuated by the one pulse to reset the counter 2 and with the counter 2 thus resuming its counting operation from the beginning, the output terminal Qn of the counter 2 thereafter produces an H output at the end of every 250 msec. Then, in the same manner as mentioned above, the counter 25 up counts by one step to renew the display value at the end of every 250 msec.

In the above operation, the counter 25 up counts by one step immediately after the switch 4 is closed; 500 msec after that, the counter 25 again up counts by one step; and then the counter 25 continues to up count stepwise every 250 msec. During this operation, the display device 34 displays a film sensitivity setting value of "100" when the count value outputs Q0 and Q3 of the counter 25 become high levels, while the levels of other outputs Q1, Q2 and Q4 of the counter 25 are low levels. In that instance, the AND gate 30 produces an H output which is impressed on the AND gate 17. This inhibits the response of the gate 18 to the output Qn of the counter 2 and, allows the gate 17 to respond to the other output Qn+1 of the counter 2. Therefore, 500 msec after the appearance of the display value "100", the one-shot multivibrator (the flip-flop DFF 20 and the gate 21) operates, in the manner described in the foregoing causing counter 25 to up count by one step and to shift the display value from "100" to "125". Furthermore, when the number of pulses counted by the counter 25 is increased by one pulse, the output level of the AND gate 30 changes from H to L. As a result, an H input is impressed on one of the input terminals of the AND gate 18. After that, therefore, the one-shot multivibrator (the flip-flop DFF 20 and the gate 21) produces one pulse in response to the H output of the output terminal Qn of the counter 2. This causes the counter 25 to up count again every 250 msec, renewing the display value every 250 msec. Then, during the stepwise display value renewing process performed from "125" every 250 msec, the outputs Q0-Q3 of the counter 25 become high levels and the output Q4 and L level when the displayed value becomes "400". In this instance, the AND gate 29 produces an H output and this H output is supplied via the gate 35 to the AND gate 17. Accordingly, in this instance, the one-shot multivibrator (the flip-flop DFF 20 and the gate 21) becomes responsive to the H output of the output terminal Qn+1 of the counter 2 in the same manner as in the case of the above film sensitivity display value of "100". Therefore, the counter 25 up counts by one step after the lapse of 500 msec, shifting the display value from "400" to "500". Furthermore, after the display value is shifted to "500", the counter 25 again up counts at intervals of 250 msec for renewal of the display value.

With the switch 4 constantly depressed in this manner, the display value is automatically renewed. A digital value corresponding to a desired film sensitivity value can be set at the counter 25 by stopping the depressing operation on the switch 4 when the display value reaches the desired value.

When the switch 4 is continuously depressed, the display value is renewed normally at intervals of 250 msec. When the display value becomes the film sensitivity values of "100" and "400", the display value remains at these values for a longer period, which is 500 msec. This arrangement facilitates setting operations for normally frequently employed film sensitivity values such as ASA 100, 400, etc. Furthermore, in the event that the display value reaches a higher limit of film sensitivity with the switch 4 continuously depressed, the gate 32 also produces an L output lowering the output level of the gate 9, so that the ensuing counting operation of the counter 25 can be inhibited.

When the switch 6 is continuously depressed, instead of the switch 4, the information setting operation takes place in the same manner as in the situation with the above continuously depressed switch 4 with the exception that, in this case, the counter 25 is shifted to a down counting mode instead of the up counting mode. The display value is renewed immediately after commencement of depression of the switch 6. Then, 500 msec after that, the display value is again renewed. Following this, ensuing renewals of the display value are effected at intervals of 250 msec with the exception that the display values "100" and "400" are respectively renewed after the lapse of 500 msec.

In the information setting device according to the invention, as described in the foregoing, the setting information is renewed stepwise at intervals of a relatively short predetermined time and, when the setting information reaches a normally frequently used setting value, the time interval before an ensuing renewal step is longer. Therefore, while the information setting operation can be promptly carried out as a whole, information can always be set a a normal frequently used value in the event that the information is to be set at that specific value.

In the specific embodiment described, film sensitivity is described, by way of example, as the information to be set. Furthermore, the film sensitivity values of ASA 100 and ASA 400 are described as the normal frequently used value. However, the film sensitivity value ASA 100 alone may be selected as the normal frequently used value.

In the event that a shutter time or aperture value is to be set in addition to a film sensitivity value, 1/125 sec of F 5.6, etc. may be selected as the normal frequently used value. Then, the information can always be set at that value in the event that it is to be set at the normal frequently used value in the same manner as in the case of film sensitivity.

This invention is applicable not only to information setting devices for cameras but also, for example, to frequency setting devices for setting desired frequency values in radio or TV sets.

Furthermore, in the embodiments described, the output terminals of the counter are selected when the normal frequently used value is detected. However, instead of such an arrangement, counters may be separately arranged, one for a longer period of time and the other for a shorter period of time. Upon detection of a normal frequently used value, the counter for the longer time may be selected.

What is claimed is:

1. A device for setting photographic information, etc., comprising:
    (a) an operation member for information setting operations;
    (b) an information forming circuit arranged to periodically renew the setting value of said information from one value to another in response to the operation of said operation member; and
    (c) a control circuit which extends the period of said periodical renewal when the value of information set by said information forming circuit becomes a specific value to have a longer period for renewal of said specific value into another than the period provided for renewal of other values.

2. A device for setting photographic information, etc., comprising:
    (a) an operation member for information setting operations; and
    (b) an information forming circuit for periodical renewal of the setting value of said information from one value to another in response to the operation of said operation member, said circuit being arranged to have said information setting value renewed into another value after the lapse of a first length of period when the setting value becomes a first value and to have the information setting value renewed into another value after the lapse of a specific second length of period which is longer than the first length of period when the setting value becomes a specific second value.

3. A device for setting photographic information, etc., comprising:
    (a) switch means arranged to shift from a first state to a second state in setting information; and
    (b) an information forming circuit which periodically renews the setting value of information from one value to another in a predetermined cycle in response to the shift of said switch means from the first state to the second, said circuit being arranged such that, during said periodic renewal, a longer period is provided for renewal of the information setting value when the setting value becomes a specific value.

4. An information setting device arranged to continuously set and renew the value of information to be set such as photographic information or the like from one value to another one after another after the lapse of every renewal period, comprising:
   (a) means for changing said renewal period from a first length of period to a second length of period, and vice versa; and
   (b) a control circuit arranged to have said renewal period switched over from the first period to the second when the setting value of said information becomes a specific value.

5. An information setting device arranged to continuously set and renew the value of information to be set such as photographic information or the like from one value to another one after another after the lapse of a first length of every renewal period, comprising:
   (a) means for varying said renewal period;
   (d) means for detecting the setting value of said information and for causing said varying means to vary said renewal period from said first length when said setting value is a predetermined specific value.

6. A device for setting photographic information, etc., comprising:
   (a) an information forming circuit which, in setting said information, continuously renews the setting value of the information at the lapse of a predetermined first length of every renewal period;
   (b) a control circuit which changes the length of the renewal period to a second length which differs from said first length every time the setting value becomes a specific value.

7. A device for setting photographic information, etc., comprising:
   (a) switch means for setting information, said switch means being manually shiftable from a first state to a second state;
   (b) an information forming circuit which renews the setting value of said information every time said switch means is shifted to the second state, said circuit being arranged to renew said setting value a predetermined period of time after said switch means is shifted to the second state; and
   (c) a control circuit which is arranged to make the renewal period longer than said predetermined period of time when said switch means is shifted to the second state in the event that said setting value is set at a specific value.

8. A device for setting photographic information, etc., comprising:
   (a) an information forming circuit having a first mode in which the setting value of said information is continuously renewed in a predetermined cycle while an operation member is being operated and a second mode in which the setting value is renewed every time said operation member is operated; and
   (b) a control circuit which makes the period of renewal from one setting value to another longer when the setting value becomes a specific value in said first mode.

9. A device according to claim 1, 3, 4, 6 or 7, wherein said specific value is a normally frequently used value.

* * * * *